United States Patent [19]
Asamori et al.

[11] Patent Number: 6,048,905
[45] Date of Patent: Apr. 11, 2000

[54] LIQUID AMINE COMPOSITION FOR EMULSIFIERS FOR BITUMEN

[75] Inventors: Katsuhiko Asamori, Wakayama, Japan; Shigeru Nagao, Samuthprakarn, Thailand; Ryoichi Tamaki, Wakayama, Japan; Takao Taniguchi, Wakayama, Japan; Keiichiro Tomioka, Wakayama, Japan; Kouji Koyanagi, Wakayama, Japan

[73] Assignee: Kao Corporation, Tokyo, Japan

[21] Appl. No.: 09/144,975

[22] Filed: Sep. 1, 1998

[30] Foreign Application Priority Data

Sep. 1, 1997 [JP] Japan ................................ 9-235912

[51] Int. Cl.$^7$ .......................... B01F 17/16; B01F 17/46; B01J 13/00; C08L 95/00
[52] U.S. Cl. ............................ 516/45; 106/277; 516/43; 516/914; 516/916
[58] Field of Search ................. 516/43, 45; 106/277; 514/914, 916

[56] References Cited

U.S. PATENT DOCUMENTS

| | | | |
|---|---|---|---|
| 2,690,978 | 10/1954 | Cross | 516/45 X |
| 2,886,458 | 5/1959 | Ceintrey | 516/43 X |
| 3,518,101 | 6/1970 | Gzemski et al. | 516/43 X |
| 3,975,295 | 8/1976 | Koch | 516/43 |
| 4,172,046 | 10/1979 | Doi et al. | 516/43 |
| 4,430,127 | 2/1984 | Dalter et al. | 516/43 X |
| 5,098,604 | 3/1992 | Brovard et al. | 516/45 |

FOREIGN PATENT DOCUMENTS

| | | |
|---|---|---|
| 2060483A | 7/1984 | Australia . |
| 59-123523 | 7/1984 | Japan . |

*Primary Examiner*—Richard D. Lovering
*Attorney, Agent, or Firm*—Birch, Stewart, Kolasch & Birch, LLP.

[57] ABSTRACT

The present invention provides a liquid amine composition for an emulsifier for bitumen which can impart, to a bituminous emulsion, more excellent emulsifying stability and adhesive properties to aggregates than conventional products. The liquid amine composition for the emulsifier for bitumen of the present invention comprises (1) 5 to 70% by weight a monoamine having an aliphatic hydrocarbyl group of 8 to 22 carbon atoms, (2) 20 to 80% by weight of a polyamine having an aliphatic hydrocarbyl group of 8 to 22 carbon atoms, and (3) 10 to 75% by weight of an organic acid of 4 to 18 carbon atoms.

11 Claims, No Drawings

LIQUID AMINE COMPOSITION FOR EMULSIFIERS FOR BITUMEN

BACKGROUND OF THE INVENTION

1. Field of the Invention

The present invention relates to an amine composition for emulsifier for bitumen which can easily be handled and which is liquid at ordinary temperature. More specifically, the present invention relates to a liquid amine composition which is a precursor of an emulsifier for emulsifying a bituminous materials such as asphalt and which is excellent in handling properties and which can impart, to a finally emulsified bituminous materials, more excellent emulsifying stability and adhesive properties to aggregates than conventional products.

2. Prior Art

Amine compounds each having a hydrocarbon group of at least 8 carbon atoms have been widely used in various industrial applications, because cationic surface active agents derived from the amine compounds can exert excellent properties. For example, these amine compounds are useful as aqueous emulsifying agents for bituminous materials, i.e., viscous solid like oils called petroleum asphalts, bitumens and the like in applications of a road pavement material, a waterproof material for a shore bank, and a roofing material. Furthermore, it is also known that these amine compounds are useful as a floating separation agent for minerals, an antistatic agent for polymers, fibers and the like, a corrosion inhibitor for metals, and an anticoagulant for fertilizers.

In order to exert the excellent properties of the amine compounds in these applications, high adsorbing properties to an object are required, and thus, the amine compounds each having a long chain hydrocarbyl group have been preferably used. However, most of such amine compounds are solid at room temperature, and so, it is inconvenient to handle them. Therefore, for the liquefaction of these amine compounds, various investigations have been heretofore conducted. Such a handling problem is particularly noticeable in winter and in cold districts.

For example, in U.S. Pat. Nos. 4,496,474 and 5,098,604, for the purpose of lowering a melting point, it has been disclosed to use alkyl ether amine, branched alkyl amine, or an oxyalkylated amine which have a poor crystalization property. In such a case, however, there is a disadvantage that the cationic surface activity deteriorates, and even if the amount of the amine is increased, the excellent characteristics which the solid amine has cannot be exerted on occasion.

Furthermore, in JP-A 59-123523, a liquid amine composition containing an aliphatic amine and a specific carboxylic acid has been disclosed. This liquid amine composition is liquid even at a low temperature, and in the case that the liquid amine composition is used as a cationic surface active agent, an amine hydrochloride is formed by adding a strong acid such as hydrochloric acid, so that it is possible to obtain almost the same performance as the original solid amine.

It is not known in the state of arts what relation should take place between an amine composition, emulsion stability of bituminous materials and adhesion performance of bituminous materials. With the aggrandizement of weight of cars and the speed up of cars in recent years, higher adhesive properties to aggregates have been strongly required. This is the reason why harder asphalts having a small penetration have been widely used. However, such conventional products do not always satisfy the required performance.

SUMMARY OF THE INVENTION

Under such circumstances, the present invention has been developed to further improve the emulsifying stability and handling properties, and thus, an object of the present invention is to provide an amine composition which is liquid at ordinary temperature and which permits the formation of an emulsion having a higher performance.

The present inventors have intensively investigated a relation between an amine composition and the emulsifying stability of bituminous materials and a relation between the amine composition and the adhesive properties of bituminous materials after the decomposition of an emulsion for the purpose of elucidating the optimum amine composition. As a result, there can be found liquid amine compositions for an emulsifier for bituminous materials which can impart such a high emulsifying stability and such adhesive properties to the aggregates as have not heretofore been present. Furthermore, among these novel liquid amine compositions, a composition having a low viscosity and hence more excellent handling properties has been found.

That is to say, an object of the present invention is to provide a liquid amine composition for an emulsifier for bituminous materials which comprises (1) 5 to 70% by weight of a monoamine having an aliphatic hydrocarbyl group of 8 to 22 carbon atoms, (2) 20 to 80% by weight of a polyamine having an aliphatic hydrocarbyl group of 8 to 22 carbon atoms, and (3) 10 to 75% by weight of an organic acid of 4 to 18 carbon atoms.

DETAILED DESCRIPTION OF THE INVENTION

A monoamine (1) having an aliphatic hydrocarbyl group of 8 to 22 carbon atoms which can be used in the present invention is an aliphatic amine compound represented by the formula $R_1R_2R_3N$ wherein $R_1$ is a straight chain hydrocarbyl group of 8 to 22 carbon atoms, $R_2$ and $R_3$ are each a hydrogen atom or a straight chain hydrocarbyl group having 8 to 22 carbon atoms. Typical examples of the monoamine include alkylamines such as decylamine, laurylamine, myristylamine, cetylamine, stearylamine, behenylamine, tallowamine and hydrogenated tallowamine.

A polyamine (2) having an aliphatic hydrocarbyl group of 8 to 22 carbon atoms which can be used in the present invention is an aliphatic amine represented by the formula $R_1R_2N(ANH)_pH$ wherein $R_1$, $R_2$ and $R_3$ are as defined above, A is an ethylene group or a propylene group, and P is a value of 1 to 4.

Typical examples of the polyamine include diamines obtained by reacting the above mentioned monoamine (1) with acrylonitrile, and then hydrogenating the reaction product, and examples of these diamines include N-aminopropylalkylamines such as N-aminopropyldecylamine, N-aminopropyllaurylamine, N-aminopropylmyristylamine, N-aminopropylcetylamine, N-aminopropylstearylamine, N-aminopropylbehenylamine, N-aminopropyl tallowamine and N-aminopropyl hydrogenated tallowamine.

Furthermore, additional examples of the polyamine include triamines and tetramines obtained by repeating the same process. Examples of the triamines include N-alkyldipropylenetriamines such as N-decyldipropylenetriamine, N-lauryldipropylenetriamine, N-myristyldipropylenetriamine, N-cetyldipropylenetriamine, N-stearyldipropylenetriamine, N-behenyldipropylenetriamine, N-tallowdipropylenetriamine and hydrogenated N-tallowdipropylenetriamine; and examples of the tetramines include N-alkyltripropylenetetramines such as N-decyltripropylenetetramine, N-lauryltripropylenetetramine, N-myristyltripropylenetetramine, N-cetyltripropylenetetramine, N-stearyltripropylenetetramine, N-behenyltripropylenetetramine, N-tallowtripropylenetetramine and hydrogenated N-tallowtripropylenetetramine. In addition, examples of the tetramines include diamines and triamines obtained by the reaction of a halogenated hydrocarbon with each of ethylenediamine and diethylenetriamine.

In the present invention, the liquid amine composition can contain an alkylene oxide adduct such as an ethylene oxide adduct or a propylene oxide adduct of the above mentioned monoamine or polyamine having the aliphatic hydrocarbyl group of 8 to 22 carbon atoms in an amount of 10 to 300 parts by weight, preferably 40 to 150 parts by weight based on 100 parts by weight of the total of the monoamine (1) and the polyamine (2). From both the viewpoints of a liquid property improvement and an emulsifying performance, the above range is preferable. When they are used together, the blend amount of the organic acid having 4 to 18 carbon atoms which is required to obtain the liquid amine composition can be reduced. That is to say, the simultaneous use of the ethylene oxide adduct can improve the liquid properties.

Of the above mentioned monoamines and polyamines, it is a preferable embodiment that the aliphatic hydrocarbyl group having 8 to 22 carbon atoms is derived from tallow or hydrogenated tallow.

Examples of an organic acid (3) having 4 to 18 carbon atoms which can be used in the present invention include carboxylic acids having 4 to 18 carbon atoms, acidic phosphoric acid esters having 4 to 18 carbon atoms, and sulfur acid compounds having 4 to 18 carbon atoms.

Examples of the carboxylic acids having 4 to 18 carbon atoms include aliphatic carboxylic acids and naphthenic carboxylic acids, and examples of the aliphatic carboxylic acids include straight chain saturated fatty acids such as butyric acid, valeric acid, caproic acid, heptanoic acid, caprylic acid and capric acid, branched saturated fatty acids such as isobutyric acid, 2-methylbutyric acid, 3-methylbutyric acid, 2-methylvaleric acid, 3-methylvaleric acid, 4-methylvaleric acid, 2-ethylhexanoic acid, isononanoic acid, isodecanoic acid, isotridecanoic acid, isotetradecanoic acid, isopalmitic acid and isostearic acid, and unsaturated fatty acids such as decenoic acid, undecenoic acid, dodecenoic acid, myristoleic acid, palmitoleic acid, oleic acid, linoleic acid and linolenic acid. Tertiary carboxylic acids obtained by the Koch reaction of olefins and carbon monoxide can also be used. As the naphthenic carboxylic acids, naphthenic acids obtained from a crude oil by alkaline extraction can be used. Above all, the branched aliphatic carboxylic acids having 4 to 10 carbon atoms can be preferably used.

Furthermore, examples of the acidic phosphoric acid esters having 4 to 18 carbon atoms include butyl phosphate, pentyl phosphate, hexyl phosphate, octyl phosphate, 2-ethylhexyl phosphate, nonyl phosphate, decyl phosphate, undecyl phosphate, dodecyl phosphate and isotridecyl phosphate. Examples of the sulfur acid compounds having 4 to 18 carbon atoms include sulfonic acid compounds of sulfonic compounds of α-olefins having 4 to 18 carbon atoms, sulfonic compounds of alkylbenzenes having a hydrocarbyl group of 4 to 12 carbon atoms and sulfonic compounds of alkylphenols having a hydrocarbyl group of 4 to 12 carbon atoms, and acidic sulfuric acid esters of alcohols having 4 to 18 carbon atoms.

According to the present invention, the content of the monoamine (1) having the aliphatic hydrocarbyl group of 8 to 22 carbon atoms is in the range of 5 to 70% by weight, the content of the polyamine (2) having the aliphatic hydrocarbon group of 8 to 22 carbon atoms is in the range of 20 to 80% by weight, and the content of the organic acid (3) of 4 to 18 carbon atoms is in the range of 10 to 75% by weight. More preferably, the content of the component (1) is in the range of 10 to 40% by weight, the content of the component (2) is in the range of 20 to 50% by weight, and the content of the component (3) is in the range of 20 to 50% by weight. These amounts are suitably adjustable in compliance with the kinds of monoamine and polyamine to be used, but from the viewpoint of obtaining excellent adhesive properties to aggregates and emulsifying stability, the content weight ratio of the monoamine (1) to the polyamine (2) is preferably in the range of 5/95 to 30/70, more preferably 5/95 to 50/50.

According to the present invention, the liquid amine composition can contain water (4) in such an amount that the system is not separated. In the case that water is contained, the viscosity of the liquid amine composition lowers, whereby handling properties can be further improved. The amount of water is such that the viscosity of the composition becomes preferably 4000 mPa.s or less, more preferably 2000 mPa.s or less. This viscosity-decreasing effect depends on the kinds of raw material amine and fatty acid to be used, and particularly in the case that the branched fatty acid, for example, a branched aliphatic carboxylic acid having 4 to 10 carbon atoms is used, the viscosity-decreasing effect is large. In the case of the straight chain fatty acid, a liquid crystal is formed depending on the composition, so that a highly dimensional structure is formed and so the viscosity-decreasing effect cannot sufficiently be obtained on occasion. When water is added in an excessive amount, turbidity occurs on occasion, and during a long term storage, a precipitate is formed sometimes. The easiness of this precipitate formation is affected by the kind of raw material amine to be used as well as the kind and the amount of fatty acid. Therefore, the amount of water to be added is required to be adjusted so that the system is not separated by the formation of the precipitate. More concretely, water may be added in an amount of 2 to 50 parts by weight based on 100 parts by weight of the total amount of the monoamine (1), the polyamine (2) and the organic acid (3). Even a small amount of water can exert the viscosity-reducing effect, but if the amount of water is smaller than 2 parts by weight, the effect is insufficient, and even if the amount of water is more than 50 parts by weight, the viscosity-reducing effect can scarcely be improved and the precipitate is formed, so that the system inconveniently tends to be separated.

According to the present invention, the liquid amine composition can further contain at least one of monovalent or polyvalent alcohols (5) in an amount of 2 to 50 parts by weight based on 100 parts by weight of the total of the monoamine (1), the polyamine (2) and the organic acid (3). The alcohol also contributes to the decrease in the viscosity of the liquid amine composition, and examples of the alcohol include monovalent alcohols such as methanol, ethanol, isopropanol, butanol, pentanol, hexanol, methylpentanol, octanol, 2-ethylhexanol, isodecyl alcohol, isotridecyl alcohol and oleyl alcohol, and polyvalent alcohols such as ethylene glycol, propylene glycol, glycerin, polyglycerin, diethylene glycol, polyethylene glycol and polypropylene glycol. Incidentally, in water or the alcohol which can be blended with the liquid amine composition, a water soluble polymer or phenol compound can be dissolved. According to the present invention, the liquid amine composition further contains at least one acid (6) selected from the group consisting of mineral acids, acetic acid and propionic acid in an amount of 0.05 to 10 parts by weight based on 100 parts by weight of the total of the monoamine (1), the polyamine (2) and the organic acid (3). Examples of the mineral acids include hydrochloric acid, sulfuric acid, nitric acid and phosphoric acid, and they may be used in a combination of two or more thereof. When such an acid is added to the liquid amine composition to which water has been added to decrease the viscosity and improve the handling properties, problems of turbidity occurrence and precipitate formation during a long term storage are minimized. In this case, if the amount of the acid is less than 0.05 part by weight, the turbidity improvement effect is insufficient, and on the other hand, if it is more than 10 parts by weight, the viscosity of the liquid amine composition inconveniently tends to increase again. More preferably, the amount of the acid (6) is in the range of 0.5 to 5 parts by weight.

No particular restriction is put on a method for obtaining a bituminous emulsion of an asphalt or the like by using the liquid amine composition of the present invention as the emulsifier for bituminous materials. However, one example comprises preparing an aqueous solution of the liquid amine composition of the present invention having a pH of about 1 to 5 with a monobasic acid, elevating the temperature of the solution to about 30 to 50° C., mixing it with a molten asphalt heated to 120–180° C. and then, if necessary, stirring and shearing the mixture to form an emulsion. The amount of the liquid amine composition of the present invention is in the range of 0.05 to 10% by weight, preferably 0.1 to 3% by weight based on the emulsified asphalt, and the amount of a bituminous substance such as the asphalt is in the range of 50 to 80% by weight, more generally 60 to 75% by weight in the emulsion. Examples of the usable monobasic acid include hydrochloric acid, nitric acid, formic acid, acetic acid and monochloroacetic acid, and its amount is more than a neutral equivalent of the liquid amine composition to be used, and more generally, it is in the range of about 1.2 to 1.8 times as much as the neutral equivalent.

EXAMPLES

Next, the present invention will be described with reference to examples, but the scope of the present invention should not be limited to these examples at all.

Preparation of Asphalt Emulsion and Evaluation of Performance

Amine compositions shown in Tables 1 to 4 were changed to aqueous solutions in the form of an amine hydrochloride. The amount of hydrochloric acid was adjusted so that a pH of the aqueous solution might be 2. 415 g of this aqueous solution was heated to 45° C., and it was passed through a harrel type homogenizer together with 600 g of a straight asphalt having a penetration of 80 to 100, which had been heated to 145° C. to melt. An asphalt emulsion was obtained. In this case, the amount of the amine hydrochloride to be added was adjusted so as to be 0.15% by weight to the total of the asphalt emulsion. For this asphalt emulsion, an emulsifying stability and adhesive properties to an aggregate were measured by the following procedures. The results are shown in Tables 1 to 4, and chemical structures of the used amines are shown in Table 5. The values showing the compositions in the tables are on % by weight, unless otherwise noted. Furthermore, solidification temperature of the amine composition was measured by carrying out a fluidity evaluation every 1° C. in accordance with JIS K2269, and a viscosity was measured by the use of a B type rotary viscometer made by Tokyo Keiki Co., Ltd.

[Test of the Emulsifying Stability]

About 250 ml of a prepared asphalt emulsion sample was transferred to a cylindrical container in accordance with ASTM D244-86, and then allowed to stand at room temperature of about 20° C. for one day. 50 g of the emulsion was sampled from the upper portion and the lower portion of the cylinder, respectively, and evaporation residues % were measured. A difference between the evaporation residues % of the upper portion and the lower portion indicates emulsion stability. It can be considered that the smaller the difference value is, the better the emulsifying stability is. The measurement of the evaporation residues % was made by the following procedure. That is to say, a taken asphalt emulsion sample was weighed in a vessel stipulated by ASTM D244-86, and then heated for 30 minutes by the use of an electric heater, while stirred. After it had been observed that any water was not present, the heating was further conducted at 160° C. for 1 minute. Afterward, the sample was allowed to stand at room temperature, and the weight (g) of the resultant residue was measured. A percent of the residue to the sample was regarded as the evaporation residue%.

[Test of the Adhesive Properties to Aggregates]

Pieces of ground lime stone having a size of 10 to 15 mm were immersed in water for one minute, and after taken out, they were immediately immersed in an asphalt emulsion for one minutes. Next, these stone pieces were taken out of the emulsion, and they were placed side by side on a sieve of No. 14 (1.4 mm), and then allowed to stand at room temperature for 5 hours. Afterward, they were immersed in hot water of 80° C. for one hour, and a peeling state of the asphalt was observed. A ratio of an area on the stone surfaces covered with an asphalt film was visually measured, and an adhesion area (%) was then calculated. This was represented as the adhesive properties to the aggregates (%). The larger this value is, the stronger the adhesive properties are, which is preferable. However, the number of the ground stones which were used in one test was 10, and an average value of the 10 ground stones was regarded as the adhesive properties to the aggregates.

TABLE 1

| | Example | | | | | | | | | | | | | | Comparative Example | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 |
| (Monoamine/ polyamine) | | | | | | | | | | | | | | | | | | |
| Tallowmonoamine | 7 | | | 15 | 15 | 15 | 26 | 24 | 24 | 17 | 14 | 31 | 37 | | | 2 | 55 | 72 |
| Stearylmonoamine | | 7 | | | | | | | | | | | | 37 | | | | |
| Hydrogenated tallowmonoamine | | | 7 | | | | | | | | | | | | | | | |
| Tallowdiamine | 36 | 36 | 36 | 32 | 32 | 32 | 25 | 26 | 23 | 30 | 18 | 21 | 18 | 18 | 72 | 70 | 17 | |
| Tallowtriamine | 29 | 29 | 29 | 25 | | | | | | | | 20 | 17 | | | | | |
| Tallowdiamine EO adduct | | | | | 25 | | 35 | 30 | 25 | 20 | 13 | | | 17 | | | | |
| Tallowdiamine PO adduct | | | | | | 25 | | | | | | | | | | | | |
| Weight ratio of | 10/ | 10/ | 10/ | 21/ | 21/ | 21/ | 30/ | 30/ | 33/ | 25/ | 31/ | 43/ | 51/ | 51/ | 0/ | 3/ | 76/ | 100/ |

TABLE 1-continued

|  | Example |  |  |  |  |  |  |  |  |  |  |  |  |  | Comparative Example |  |  |  |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 | 3 | 4 |
| monoamine/polyamine | 90 | 90 | 90 | 79 | 79 | 79 | 70 | 70 | 67 | 75 | 69 | 57 | 49 | 49 | 100 | 97 | 24 | 0 |
| Total of amine portions | 72 | 72 | 72 | 72 | 72 | 72 | 86 | 80 | 72 | 58 | 45 | 72 | 72 | 72 | 72 | 72 | 72 | 72 |
| (Organic acid) |  |  |  |  |  |  |  |  |  |  |  |  |  |  |  |  |  |  |
| 2-Ethylhexanoic acid | 28 | 28 | 28 | 28 | 28 | 28 | 14 | 20 | 28 | 42 | 55 | 28 | 28 | 28 | 28 | 28 | 28 | 28 |
| Solidification temperature (° C.) | 10 | 12 | 12 | 11 | 0 | −2 | 10 | 7 | 3 | −5 | −4 | 13 | 12 | 9 | 20 | 21 | 19 | 23 |
| Viscosity (cP, 25° C.) | 1100 | 1500 | 1500 | 1600 | 740 | 520 | 1300 | 1050 | 1100 | 850 | 1000 | 2600 | 2200 | 1500 | 5200 | 5400 | 4700 | 5700 |
| Emulsifying stability (%) | 0.8 | 0.4 | 0.5 | 0.6 | 0.7 | 0.6 | 0.7 | 0.6 | 0.6 | 0.6 | 0.4 | 0.4 | 0.5 | 0.8 | 2.5 | 2 | 3.2 | 7.6 |
| Adhesive properties to aggregates (%) | 95 | 100 | 100 | 100 | 95 | 100 | 100 | 95 | 100 | 95 | 100 | 100 | 95 | 100 | 80 | 85 | 80 | 70 |

TABLE 2

|  | Example |  |  |  |  |  |  |  |  |  | Comparative Example |  |  |  |  |
|---|---|---|---|---|---|---|---|---|---|---|---|---|---|---|---|
|  | 15 | 16 | 17 | 18 | 19 | 20 | 21 | 22 | 23 | 24 | 5 | 6 | 7 | 8 | 9 |
| (Monoamine/polyamine)*¹ |  |  |  |  |  |  |  |  |  |  |  |  |  |  |  |
| Total of amine portions | 69 | 69 | 69 | 69 | 69 | 69 | 69 | 69 | 69 | 69 | 69 | 69 | 69 | 69 | 69 |
| Weight ratio of monoamine/polyamine | 30/70 | 30/70 | 30/70 | 30/70 | 30/70 | 30/70 | 30/70 | 30/70 | 30/70 | 30/70 | 30/70 | 30/70 | 30/70 | 30/70 | 30/70 |
| (Organic acid) |  |  |  |  |  |  |  |  |  |  |  |  |  |  |  |
| 36% Hydrochloric acid |  |  |  |  |  |  |  |  | 31 |  |  |  |  |  |  |
| Acetic acid |  |  |  |  |  |  |  |  |  |  | 31 |  |  |  |  |
| Behenic acid |  |  |  |  |  |  |  |  |  |  |  | 31 |  |  |  |
| Isopropanol |  |  |  |  |  |  |  |  |  |  |  |  | 31 |  |  |
| 2-Ethylhexanol |  |  |  |  |  |  |  |  |  |  |  |  |  |  | 31 |
| Butyric acid | 31 |  |  |  |  |  |  |  |  |  |  |  |  |  |  |
| Isobutyric acid |  | 31 |  |  |  |  |  |  |  |  |  |  |  |  |  |
| Hexanoic acid |  |  | 31 |  |  |  |  |  |  |  |  |  |  |  |  |
| 3-Methylvaleric acid |  |  |  | 31 |  |  |  |  |  |  |  |  |  |  |  |
| 2-Ethylhexanoic acid |  |  |  |  | 31 |  |  |  |  |  |  |  |  |  |  |
| Isotridecanoic acid |  |  |  |  |  | 31 |  |  |  |  |  |  |  |  |  |
| Isostearic acid |  |  |  |  |  |  | 31 |  |  |  |  |  |  |  |  |
| 2-Ethylhexylphosphoric acid |  |  |  |  |  |  |  | 31 |  |  |  |  |  |  |  |
| Dodecylbenzenesulfonic acid |  |  |  |  |  |  |  |  | 31 |  |  |  |  |  |  |
| Dodecenesulfonic acid |  |  |  |  |  |  |  |  |  | 31 |  |  |  |  |  |
| Solidification temperature (° C.) | 15 | 12 | 12 | 11 | 0 | −2 | 11 | 10 | 8 | 12 | 60 | 51 | 78 | 28 | 30 |
| Viscosity (cP, 25° C.) | 1100 | 1500 | 1500 | 1600 | 740 | 520 | 1700 | 1300 | 1050 | 2200 | — | — | — | — | — |
| Emulsifying stability (%) | 0.3 | 0.4 | 0.5 | 0.6 | 0.4 | 0.6 | 0.5 | 0.5 | 0.6 | 0.5 | 0.5 | 0.5 | 0.6 | 0.4 | 0.6 |
| Adhesive properties to aggregates (%) | 100 | 100 | 100 | 100 | 100 | 100 | 100 | 100 | 100 | 100 | 100 | 100 | 100 | 100 | 100 |

*¹Mixture of tallowmonoamine/tallowdiamine/tallowtriamine in a weight ratio of 30/40/30.

TABLE 3

|  | Example |  |  |  |  |  |  |  |  |  |  |  |  |  |  |  |
|---|---|---|---|---|---|---|---|---|---|---|---|---|---|---|---|---|
|  | 25 | 26 | 27 | 28 | 29 | 30 | 31 | 32 | 33 | 34 | 35 | 36 | 37 | 38 | 39 | 40 |
| (Monoamine/polyamine) |  |  |  |  |  |  |  |  |  |  |  |  |  |  |  |  |
| Tallowmonoamine | 8 | 8 | 8 | 8 | 8 | 8 | 21 | 21 | 21 |  |  |  |  |  |  |  |
| Hydrogenated tallowmonoamine |  |  |  |  |  |  |  |  |  | 19 | 19 | 19 | 19 | 19 | 12 | 12 |
| Tallowdiamine | 38 | 38 | 38 | 38 | 38 | 38 | 35 | 35 | 35 |  |  |  |  |  |  |  |
| Hydrogenated tallowdiamine |  |  |  |  |  |  |  |  |  | 32 | 32 | 32 | 32 | 32 | 28 | 28 |
| Tallowtriamine |  |  |  |  |  |  | 13 | 13 | 13 |  |  |  |  |  |  |  |
| Hydrogenated tallowtriamine |  |  |  |  |  |  |  |  |  | 13 | 13 | 13 | 13 | 13 | 23 | 23 |
| Tallowdiamine EO adduct | 30 | 30 | 30 | 30 | 30 |  |  |  |  |  |  |  |  |  |  |  |
| Tallowdiamine PO adduct |  |  |  |  |  | 30 |  |  |  |  |  |  |  |  |  |  |
| Weight ratio of monoamine/polyamine | 10/90 | 10/90 | 10/90 | 10/90 | 10/90 | 10/90 | 30/70 | 30/70 | 30/70 | 30/70 | 30/70 | 30/70 | 30/70 | 30/70 | 19/81 | 19/81 |

TABLE 3-continued

| | Example | | | | | | | | | | | | | | | |
|---|---|---|---|---|---|---|---|---|---|---|---|---|---|---|---|---|
| | 25 | 26 | 27 | 28 | 29 | 30 | 31 | 32 | 33 | 34 | 35 | 36 | 37 | 38 | 39 | 40 |
| Total of amine portions | 76 | 76 | 76 | 76 | 76 | 76 | 69 | 69 | 69 | 64 | 64 | 64 | 64 | 64 | 63 | 63 |
| (Organic acid) | | | | | | | | | | | | | | | | |
| 2-Ethylhexanoic acid | 24 | 24 | 24 | 24 | 24 | 24 | 31 | 31 | 36 | 36 | 36 | 36 | 36 | 36 | 36 | 36 |
| Water*[1] | — | 3 | 6 | 10 | 5 | 15 | — | 2 | 5 | — | 5 | 18 | 35 | 45 | 35 | 18 |
| Ethanol*[1] | | | | | 5 | | | | | | | | | | | |
| Propylene glycol*[1] | | | | | | | | | | | | | | | 15 | |
| Polyethylene glycol (MW400)*[1] | | | | | | | | | | | | | | | | 17 |
| Solidification temperature (° C.) | 4 | 4 | 4 | 3 | 2 | 3 | 7 | 7 | 6 | 12 | 12 | 10 | 10 | 10 | 8 | 8 |
| Viscosity (cP, 25° C.) | 980 | 680 | 420 | 310 | 200 | 230 | 1700 | 1000 | 530 | 5800 | 1900 | 620 | 370 | 250 | 220 | 480 |
| Emulsifying stability (%) | 0.7 | 0.7 | 0.5 | 0.6 | 0.6 | 0.6 | 0.5 | 0.6 | 0.4 | 0.3 | 0.3 | 0.5 | 0.6 | 0.5 | 0.4 | 0.5 |
| Adhesive properties to aggregates (%) | 95 | 95 | 100 | 100 | 100 | 100 | 100 | 100 | 100 | 100 | 100 | 100 | 100 | 100 | 100 | 100 |

*[1]Parts by weight to 100 parts by weight of the total of the monoamine, the polyamine and the organic acid.

TABLE 4

| | Example | | | | | | | |
|---|---|---|---|---|---|---|---|---|
| | 41 | 42 | 43 | 44 | 45 | 46 | 47 | 48 |
| (Monoamine/polyamine) | | | | | | | | |
| Tallowmonoamine | 21 | 21 | 21 | 21 | 21 | 21 | 21 | 21 |
| Tallowdiamine | 35 | 35 | 35 | 35 | 35 | 35 | 35 | 35 |
| Tallowtriamine | 13 | 13 | 13 | 13 | 13 | 13 | 13 | |
| Tallowdiamine PO adduct | | | | | | | | 13 |
| Weight ratio of monoamine/polyamine | 30/70 | 30/70 | 30/70 | 30/70 | 30/70 | 30/70 | 30/70 | 30/70 |
| Total of amine portions | 69 | 69 | 69 | 69 | 69 | 69 | 69 | 69 |
| 2-Ethylhexanoic acid | 31 | 31 | 31 | 31 | 31 | 31 | 31 | 31 |
| Water*[1] | 20 | 20 | 20 | 20 | 20 | 20 | 20 | 20 |
| Sulfuric acid*[1] | | 0.5 | 1.9 | 3.8 | | | | |
| Acetic acid*[1] | | | | | 2.3 | 4.6 | | 2.3 |
| Propionic acid*[1] | | | | | | | 5.8 | |
| Solidification temperature (° C.) | 7 | 5 | 2 | 3 | 3 | 5 | 5 | 0 |
| Viscosity (cP, 25° C.) | 260 | 200 | 180 | 160 | 170 | 170 | 170 | 150 |
| Appearance (25° C.) | Wholly turbid | Substantially transparent | Substantially transparent | Transparent | Transparent | Transparent | Transparent | Transparent |
| Emulsifying Stability (%) | 0.5 | 0.6 | 0.7 | 0.6 | 0.5 | 0.5 | 0.8 | 0.6 |
| Adhesive properties to aggregates (%) | 100 | 100 | 100 | 100 | 100 | 100 | 100 | 100 |

*[1]Parts by weight to 100 parts by weight of the total of the monoamine, the polyamine and the organic acid.

TABLE 5

Chemical structures of amines used in examples

| | |
|---|---|
| Tallowmonoamine | R—NH$_2$ |
| | R: Tallow composition |
| Hydrogenated tallowmonoamine | R—NH$_2$ |
| | R: Hydrogenated tallow composition |
| Tallowdiamine | R—NH—CH$_2$CH$_2$CH$_2$—NH$_2$ |
| | R: Tallow composition |
| Hydrogenated tallowdiamine | R—NH—CH$_2$CH$_2$CH$_2$—NH$_2$ |
| | R: Hydrogenated tallow composition |
| Tallowtriamine | R—NH—CH$_2$CH$_2$CH$_2$—NH—CH$_2$CH$_2$CH$_2$—NH$_2$ |
| | R: Tallow composition |
| Hydrogenated tallowtriamine | R—NH—CH$_2$CH$_2$CH$_2$—NH—CH$_2$CH$_2$CH$_2$—NH$_2$ |
| | R: Hydrogenated tallow Composition |

TABLE 5-continued

Chemical structures of amines used in examples

Tallowdiamine EO adduct

R: Tallow composition
P + q + r = 3.0

Tallowdiamine PO adduct

R: Tallow composition
p + q + r = 2.2

As is apparent from the results in the tables, the liquid amine composition according to the present invention can impart, to a bituminous emulsion such as an asphalt emulsion, more excellent emulsifying stability and adhesive properties to aggregates than conventional products. In addition, the liquid amine composition of the present invention can also exert a further excellent effect in point of handling properties.

We claim:

1. A liquid amine composition for an emulsifier for bitumen, wherein the composition has a viscosity of 4000 mpa.S or less at 25° C., which comprises
   (1) 5 to 70% by weight of a monoamine having an aliphatic hydrocarbyl group of 8 to 22 carbon atoms,
   (2) 20 to 80% by weight of a polyamine having an aliphatic hydrocarbyl group of 8 to 22 carbon atoms, and
   (3) 10 to 75% by weight of an organic acid of 4 to 18 carbon atoms.

2. The amine composition claimed in claim 1, wherein the organic acid (3) is an aliphatic carboxylic acid or a naphthenic carboxylic acid, having 4 to 18 carbon atoms.

3. The amine composition according to claim 1, wherein a weight ratio of the monoamine (1) to the polyamine (2) is in the range of 5/95 to 30/70.

4. The amine composition according to claim 3, wherein the weight ratio is in the range of 5/95 to 50/50.

5. The amine composition claimed in claim 1, which contains an alkylene oxide adduct (7) of a monoamine or a polyamine having an aliphatic hydrocarbyl group of 8 to 22 carbon atoms in an amount of 10 to 300 parts by weight with regard to 100 parts by weight of the total of the monoamine (1) and the polyamine (2).

6. The amine composition claimed in claim 1 or 5, wherein the aliphatic hydrocarbyl group having 8 to 22 carbon atoms in the component (1), (2) and/or (7) is derived from tallow or hydrogenated tallow.

7. The amine composition claimed in claim 1, wherein the organic acid (3) having 4 to 18 carbon atoms is a branched aliphatic carboxylic acid having 4 to 10 carbon atoms.

8. The amine composition according to claim 1, wherein the monoamine is selected from the group consisting of decylamine, laurylamine, myristylamine, cetylamine, stearylamine, behenylamine, tallowamine and hydrogenated tallowamine.

9. The amine composition according to claim 1, wherein the monoamine is present in the range of 10 to 40% by weight, the polyamine is present in the range of 20 to 50% by weight, and the organic acid is present in the range of 20 to 50% by weight.

10. The amine composition according to claim 1, wherein the composition has a viscosity of 2000 mpa.s or less at 25° C.

11. The amine composition according to claim 1, wherein the composition further comprises at least one acid (6) selected from the group consisting of mineral acids, acetic acid and propionic acid in an amount of 0.05 to 10 parts by weight based on 100 parts by weight of the total of the monoamine (1), the polyamine (2) and the organic acid (3).

* * * * *